United States Patent
Aso et al.

(10) Patent No.: US 8,390,153 B2
(45) Date of Patent: Mar. 5, 2013

(54) LINEAR MOTOR AND METHOD OF MANUFACTURING THE SAME

(75) Inventors: Toshiyuki Aso, Tokyo (JP); Shuhei Yamanaka, Tokyo (JP); Kazuya Horiike, Tokyo (JP); Taro Miyamoto, Tokyo (JP); Yukitaka Ikeya, Tokyo (JP); Tadao Yoneta, Tokyo (JP)

(73) Assignee: THK Co., Ltd., Tokyo (JP)

(*) Notice: Subject to any disclaimer, the term of this patent is extended or adjusted under 35 U.S.C. 154(b) by 211 days.

(21) Appl. No.: 12/088,556

(22) PCT Filed: Sep. 28, 2006

(86) PCT No.: PCT/JP2006/319241
§ 371 (c)(1),
(2), (4) Date: Mar. 12, 2009

(87) PCT Pub. No.: WO2007/037298
PCT Pub. Date: Apr. 5, 2007

(65) Prior Publication Data
US 2009/0261663 A1 Oct. 22, 2009

(30) Foreign Application Priority Data
Sep. 28, 2005 (JP) ................................. 2005-282511

(51) Int. Cl.
*H02K 41/02* (2006.01)
*H02K 41/03* (2006.01)
(52) U.S. Cl. .................... 310/12.02; 310/12.33
(58) Field of Classification Search ............... 310/12.02, 310/12.21–12.23, 12.33, 12.01, 12.24, 12.25
See application file for complete search history.

(56) References Cited

U.S. PATENT DOCUMENTS

| | | | | |
|---|---|---|---|---|
| 4,858,452 A | * | 8/1989 | Ibrahim | ........................ 70/275 |
| 5,434,549 A | * | 7/1995 | Hirabayashi et al. | ......... 335/229 |
| 6,622,369 B1 | | 9/2003 | Hwang et al. | |
| 2004/0075518 A1 | * | 4/2004 | Finkbeiner | .................... 336/174 |

FOREIGN PATENT DOCUMENTS

| | | |
|---|---|---|
| JP | 9-172767 A | 6/1997 |
| JP | 11-225468 A | 8/1999 |
| JP | 2001-78420 A | 3/2001 |

(Continued)

OTHER PUBLICATIONS

Igarashi et al., JP2004357464 A Machine Translation, Dec. 2004.*

(Continued)

*Primary Examiner* — Quyen Leung
*Assistant Examiner* — Eric Johnson
(74) *Attorney, Agent, or Firm* — Westerman, Hattori, Daniels & Adrian, LLP

(57) ABSTRACT

Provided is a linear motor capable of simplifying assembling of a coil unit and stabilizing a coil pitch and the overall length of the coil unit.

The linear motor has a rod 1 having magnets 3, a plurality of coils 4 arranged in the axial direction of the rod 1, a housing 2 covering the coils 4, and a coil holder 5 holding the coils 4 in the housing 2. The coil holder 5 includes a holder main body 5a elongating in the coil arrangement direction and a plurality of spacer portions 5b made of resin and each interposed between each adjacent two of the coils 4 to insulate the coils 4 from each other, the spacer portions 5b being formed integrally with the holder main body 5a.

5 Claims, 7 Drawing Sheets

FOREIGN PATENT DOCUMENTS

| | | |
|---|---|---|
| JP | 2001-352747 A | 12/2001 |
| JP | 2004-357464 A | 12/2004 |

OTHER PUBLICATIONS

Ishiyama et al., JP11225468A Machine Translation, Aug. 1999.*
Shinpo et al, JP 09172767A Machine Translation, Jun. 1997.*
International Preliminary Report on Patentability (English translation form PCT/IPEA/409) of International Application No. PCT/JP2006/319241 with an international filing date of Sep. 28, 2006.
International Search Report of PCT/JP2006/319241, date of mailing Dec. 5, 2006.

* cited by examiner

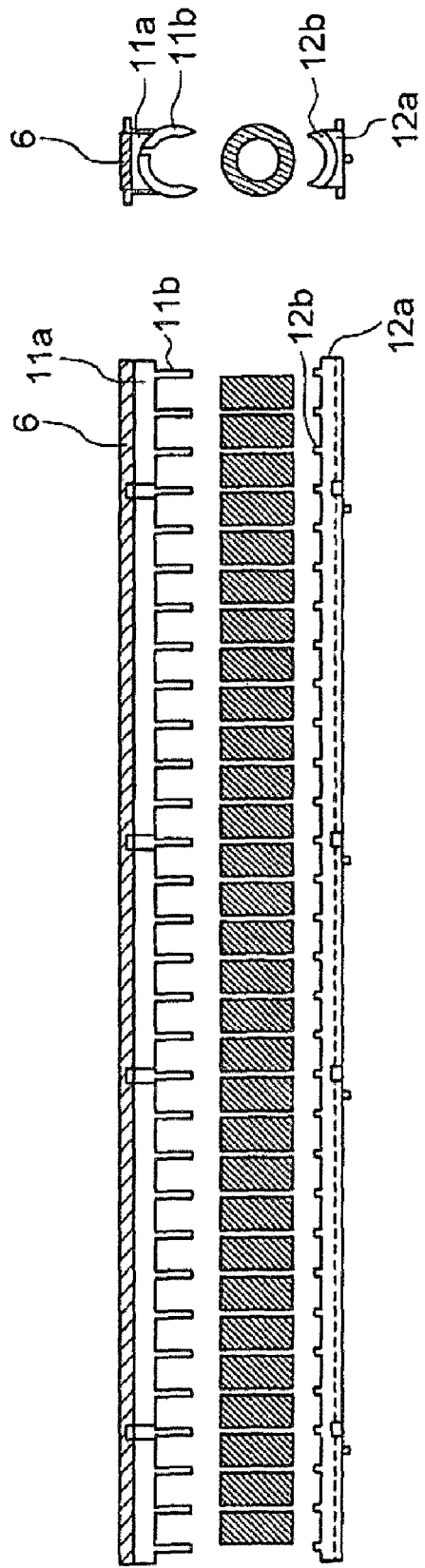

LINEAR MOTOR AND METHOD OF MANUFACTURING THE SAME

TECHNICAL FIELD

The present invention relates to a linear motor, provided with magnets and coils, for obtaining a thrust force for linear movement based on a magnetic field from the magnet and current pass through the coils. In particular, the present invention relates to a rod-type linear motor having a rod with magnets inserted into a plurality of stacked coils.

BACKGROUND ART

A linear motor is provided with a stator and a rotor, which are produced to be similar in principle to those of a rotary motor, but elongated linearly. In the linear motor, electric energy is converted into thrust for moving linearly. For this linear thrust, the linear motor is used as a one-axis actuator to enable a moving object to move linearly.

From a point of view of shapes, the linear motor can be classified into a rod type and a flat type. The rod-type linear motor is provided with a plurality of cylindrical coils which are stacked on one another and a rod having magnets is inserted into a bore (hollow space) formed by the stacked coils. For example, the plural coils are formed as three phases consisting of U, V and W phases. When three-phase currents whose phases are different from each other by 120 degrees are supplied to the coils, magnetic fields are generated to move along the axis-line direction of the coils. These moving magnetic fields give thrust to the rod, resulting in that the rod moves linearly relative to the coils in synchronization with the speed of the moving magnetic fields. In contrast, the flat-type linear motor is provided with a plurality of plate-shaped magnets arranged on a track rail and a plurality of coils arranged to face the track rail. With regard to the linear movement of the coils relative to the magnets, this flat-type linear motor obeys the same principle as the rod-type linear motor.

Coil assembling of the rod-type linear motor is performed as follows. First, coils and spacers to be interposed between coils are fit alternately one after another onto a coil arrangement shaft as a jig. Each of the spacers is ring-shaped and has a function of insulating adjacent coils from each other. Once all of the coils and the spacers are fit thereon, the coils are wired with their phases divided into U, V and W by soldering every three coil lead wires. Each of the soldered lead wires is wrapped with an insulating tube.

However, in the conventional coil assembling method of linear motor, alternate fitting of coils and spacers onto the coil arrangement shaft is followed by coil connecting operations which number of times is equal to the number of coils, and this takes much more time and manpower as the number of coils is larger. Besides, when the coils and spacers are arranged sequentially, there occur variations not only in the coil pitch, but also in the overall length of the coil unit as dimensional differences of the respective coils accumulate.

The patent document 1 discloses a method for assembling a coil unit by inserting coils into a coil guide on a one-by-one basis, or on a two-by-two basis, and laminating a plurality of such coil guides with the coils inserted therein.

Patent document 1: Japanese patent laid-open publication No. 2004-357464

DISCLOSURE OF THE INVENTION

Problems to be Solved by the Invention

However, even when the method disclosed in the Patent document 1 is utilized, there occur variations in the overall length of the coil unit as coil guides are stacked. Besides, such method needs wire connecting operations which number of times is equal to the number of coils, and such operations take much manpower.

Therefore, the present invention has an object to provide a linear motor and a manufacturing method thereof capable of simplifying assembling of a coil unit and stabilizing the overall length of the coil unit and the coil pitch.

Means for Solving the Problems

In order to solve the above-mentioned problems, a linear motor is disclosed for obtaining a thrust for linear movement with use of a magnetic field and coil carrying current, comprising: a rod having magnets; a plurality of coils surrounding the rod and arranged in an axial direction of the rod; a housing covering the coils; and a coil holder holding the coils in the housing, the coil holder having a holder main body elongating in a coil arrangement direction and a plurality of spacer portions made of resin and each interposed between each adjacent two of the coils, the spacer portions being formed integrally with the holder main body.

Further, the linear motor may also include an insulating substrate having a through hole for each of lead wires of the coils to pass through and a conductive pattern for wiring the coils.

Additionally, the linear motor may include the insulating substrate as a separate piece from the holder main body and mounted on the holder main body which has a wiring hole for each of the lead wires of the coils.

Furthermore, in the linear motor, the holder main body comprises a pair of holder main bodies which are plate-shaped and arranged in respective sides of a center line of the coils so as to surround the coils, and each of the holder main bodies has split spacer portions formed integrally therewith, and when the holder main bodies in pair are assembled, the split spacer portions constitutes the spacer portions in a ring shape.

A method of manufacturing a linear motor having a rod with magnets and a plurality of coils surrounding the rod and arranged in an axial direction of the rod and being configured to obtain a thrust for linear movement with use of a magnetic field of the magnets and current passing through the coils, includes the steps of: holding all the coils in a coil holder having a holder main body elongating in a coil arrangement direction and a plurality of spacer portions made of resin and each interposed between each adjacent two of the coils, the spacer portions being formed integrally with the holder main body; and covering the coils with a housing.

The method described above may further include the step of making each lead wire of the coils pass through a through hole of an insulating substrate having a conductive pattern formed for wiring the coils and soldering the lead wire.

Effects of the Invention

The coil unit can be assembled by fitting each coil into between spacer portions of the coil holder, thereby enabling reduction of assembling steps of the coil unit and stabilizing the coil pitch and the overall length of the coil unit.

The coils may be further wired by making lead wires of the coils positioned by the coil holder pass through wiring holes of the insulating substrate and soldering the lead wires. Accordingly, wiring of the coils is simplified.

The coil holder may be separate from the insulating substrate. Accordingly, the coil holder and the insulating substrate are able to be easily manufactured.

The coils may also be held in balance by the paired holder main bodies arranged in the respective sides of the center line of the coils. Accordingly, the coils are able to be held stably in the housing.

Further, the coil unit may be assembled by fitting each coil into between spacer portions of the coil holder, thereby enabling reduction of assembling steps of the coil unit and stabilizing the coil pitch and the overall length of the coil unit.

Additionally, the coils may be wired by making lead wires of the coils positioned by the coil holder pass through wiring holes of the insulating substrate and soldering the lead wires. Accordingly, wiring of the coils is simplified.

BRIEF DESCRIPTION OF THE DRAWINGS

FIGS. 7(A) and 7(B) are views each illustrating another example of coil holder (FIG. 7(A) being a side view thereof and FIG. 7(B) being a front view thereof).

DESCRIPTION OF REFERENCE NUMERALS

Figure 1:
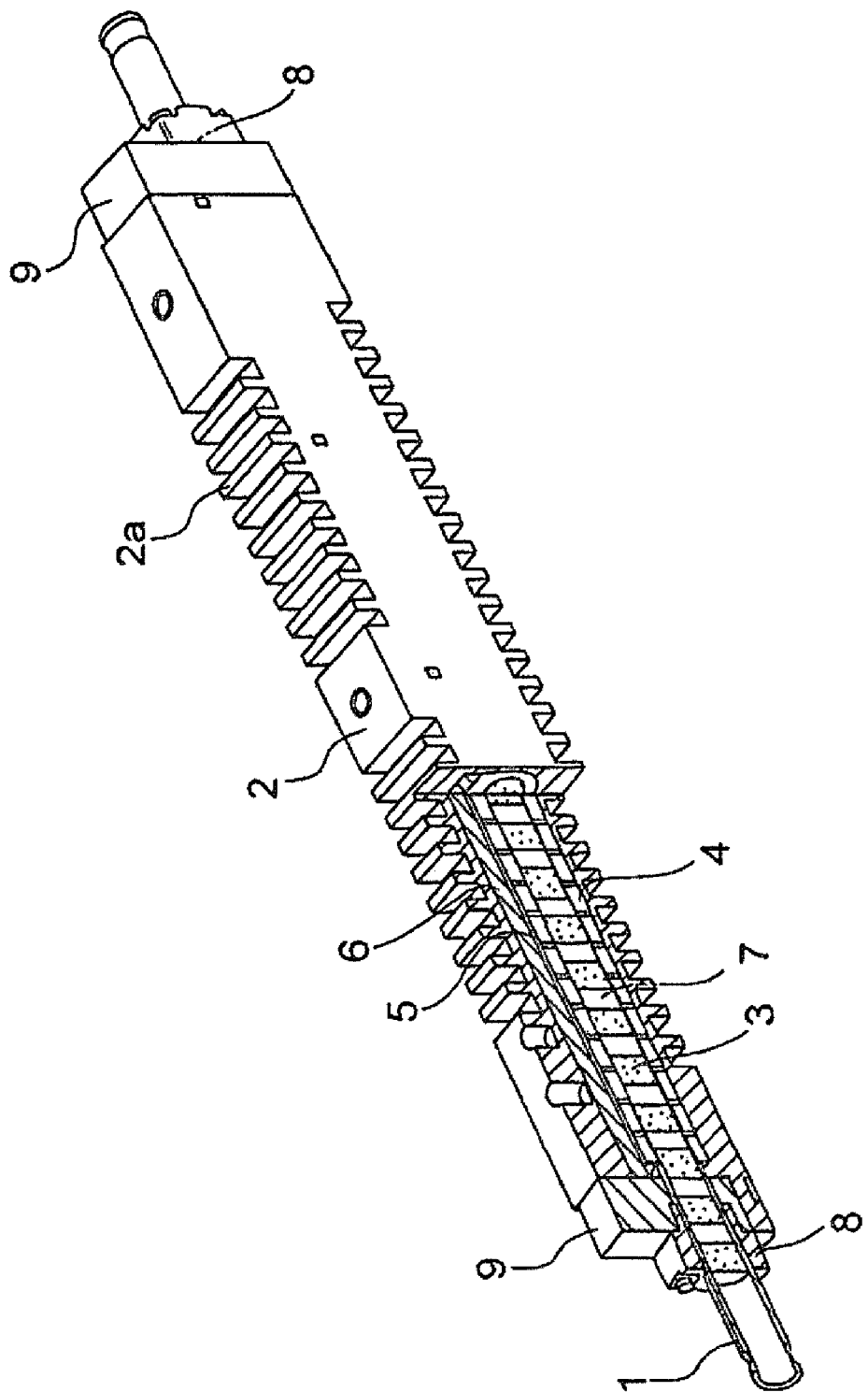
FIG. 1 is a perspective view of a linear motor according to one embodiment of the present invention (including a partial cross-sectional view thereof)

1 . . . rod
2 . . . housing
3 . . . magnet
4 . . . coil
4a . . . lead wire
5, 13 . . . coil holder
5a . . . holder main body
5b . . . spacer portion
6 . . . insulating substrate
6a . . . through hole
6b . . . conductive pattern
11a, 12a . . . holder main body
11b, 12b . . . split spacer portion

BEST MODE FOR CARRYING OUT THE INVENTION

With reference to the attached drawings, an embodiment of the present invention will now be described below. FIG. 1 illustrates a perspective view of a linear motor according to one embodiment of the present invention. The linear motor of this embodiment is a one-axis actuator having a rod 1 moving relative to a housing 2 in the axial direction of the rod 1. Such a linear motor is used in moving a moving body such as electronic components in the one axis direction. Specifically, such a linear motor is used, for example, in a head shaft of a chip mounter for mounting a chip-shaped electronic component on a predetermined position. This linear motor can be used as not only a one-axis actuator but also a multiple-axis actuator when plural linear motors are combined in parallel with each other so as to enhance operating efficiency.

Like a rotation-type motor, the linear motor obtains a force for movement by current passing through coils 4 and a magnetic field of magnets 3. On the other hand, as the linear motor is configured to move linearly unlike the rotation-type motor, a plurality of coils 4 are stacked linearly and the rod 1 with magnets 3 inserted therein passes through the stacked coils 4. When current passes through the coils 4, the rod 1 moves in its axial direction.

Figure 2:
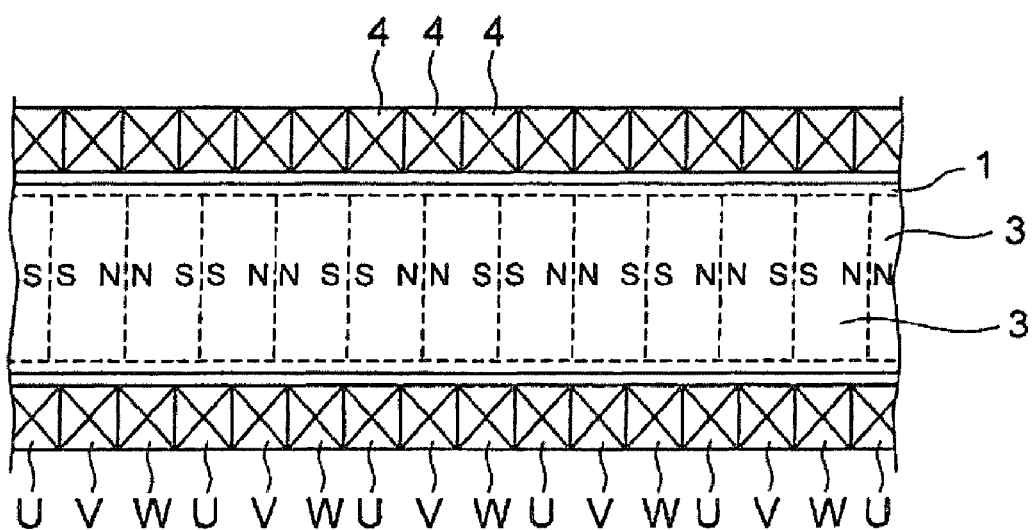
FIG. 2 is a cross-sectional view showing coils and magnets the linear motor.

Next description is made about the principle of the linear motor. FIG. 2 shows a positional relation between magnets 3 and coils 4 of the linear motor. In a hollow space of the rod 1, a plurality of disk-shaped magnets 3 (segment magnets) are stacked in such a manner that the same magnetic poles face each other, that is, the N pole and the N pole faces each other and the S pole and the S pole face each other. Around the rod 1, a plurality of coils 4 are stacked to cover the rod 1. Each three of the coils 4 constitute one three-phase coil set composed of a U-phase coil, a V-phase coil and a W-phase coil. Plural coil sets are assembled into a coil unit. When three-phase current having phases different from each other by 120° is made to pass through the three-phase coil sets of U, V and W phases, there occurs a magnetic field moving in the axial direction of the rod 1. The magnets 3 in the rod 1 obtain thrust from the magnetic field to perform linear movement relative to the coils 4 in synchronization with the moving speed of the magnetic field.

Next description is made about a structure of the linear motor. As shown in FIG. 1, the rod 1 of the linear motor is supported movable in the axial direction of the rod 1 by a housing 2. The coil unit is supported by a coil holder 5, and these coil unit and coil holder 5 are covered with the housing 2.

The rod 1 is made of, for example, a nonmagnetic material such as stainless and has a hollow space like a pipe. In the hollow space of the rod 1, as described above, the disk-shaped plural magnets 3 (segment magnets) are stacked with the same magnetic poles facing each other. Between every two of the magnets 3, there is a pole shoe (magnetic pole block) 7 made of a magnetic material such as steel or the like.

Each coil 4 is configured of a spirally wound copper wire and held by the coil holder 5. In this embodiment, in order to downsize the housing 2, the housing 2 is made by insert molding, that is, setting the coils 4 and the coil holder 5 in a die for injection molding and filling the die with molten resin or special ceramics. When molding is finished and a molded product is taken off the die, the coils 4 become surrounded with the housing 2. This insert molding has an advantage of reducing the thickness of the housing 2. For example, if linear motors are aligned to be used, downsizing of each linear motor is required. Here, even if insert molding is not performed, the coils 4 held in the coil holder 5 can be held in the housing 2 made of aluminum and a gap between the coils 4 and the housing 2 can be filled with an adhesive agent thereby to secure the coils 4 and the coil holder 5 to the housing 2.

As the housing 2 is attached to a component which utilizes the linear motor as a one-axis actuator, the housing 2 is made of a material having a high mechanical rigidity. In addition, in order to keep insulation between the housing 2 and the coils 4, the material of the housing 2 also has high insulation performance. Further, in the housing 2, a plurality of fins 2a are formed to enhance heat dissipation of the coils 4.

While the linear motor is in operation, the rod 1 is kept floating in the coils 4. In order to support linear movement of the rod 1, bushes 8 are provided to be fixed to respective end members 9 provided at both ends of the housing 2.

Figure 3:
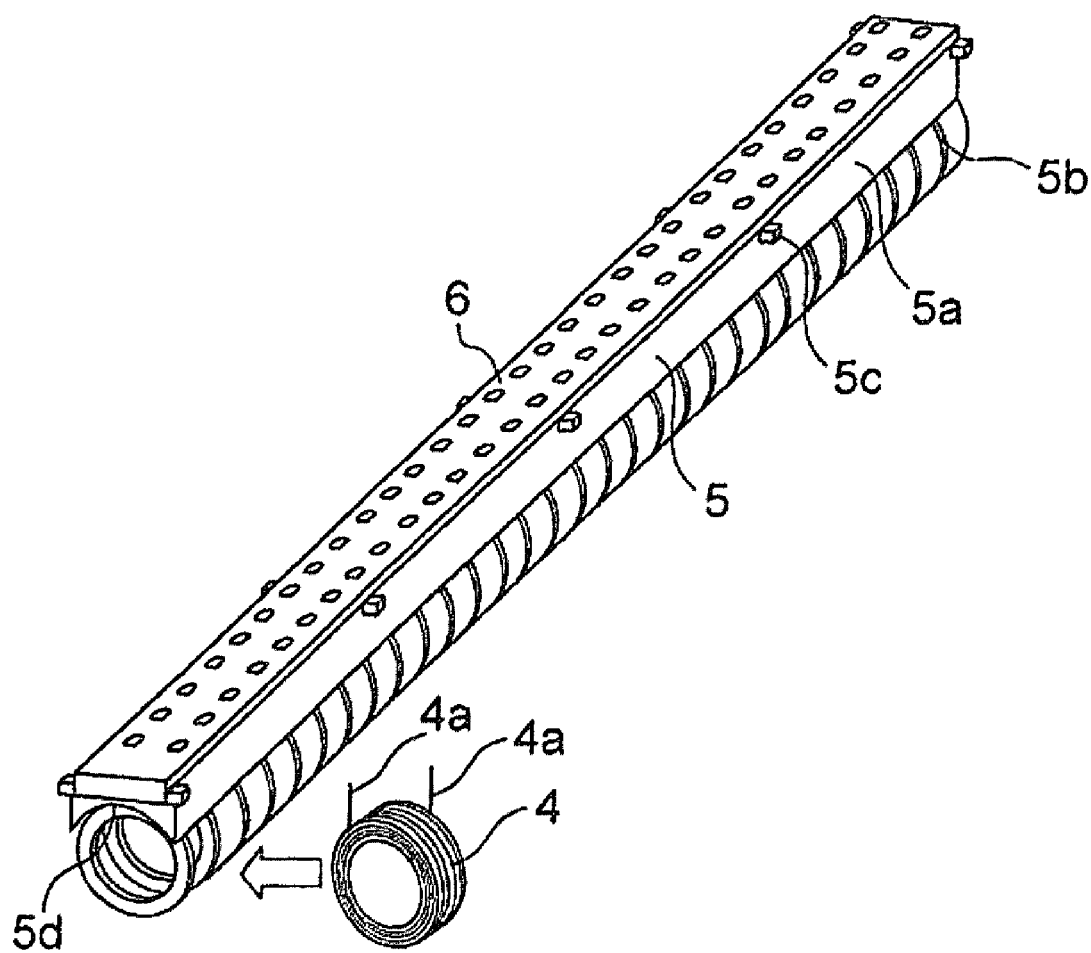
FIG. 3 is a cross-sectional view showing a coil unit held in a coil holder.

FIG. 3 illustrates a coil unit held by the coil holder 5. The coil unit has plural, or, for example, several dozen, coils 4, each of which is made from spiral turns of copper wire. Each lead wire 4a of each coil 4 needs to be connected, however, if lead wires 4a are soldered one by one, much more man-hours are needed. In order to simplify wiring of the lead wires 4a of the coils 4, an insulating substrate 6 is provided.

Figure 4:
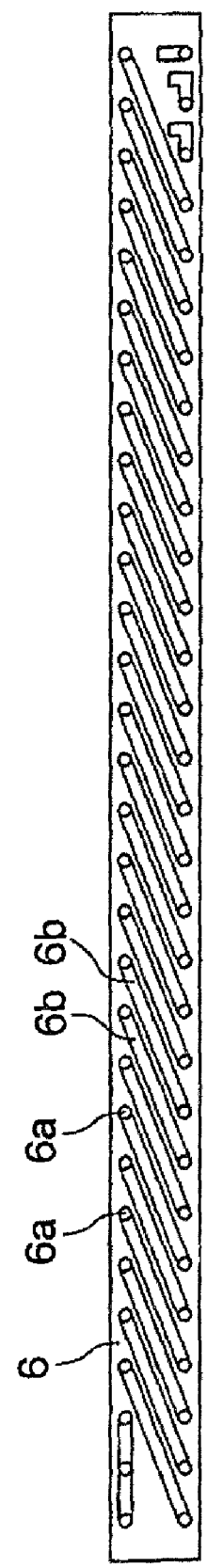
FIG. 4 is a plan view of an insulating substrate (showing a conductive pattern)

FIG. 4 is a plan view of the insulating substrate 6. The insulating substrate 6 has through holes 6a for making the lead wires 4a of the plural coils 4 pass through and a conductive pattern 6b for wiring of the plural coils 4. The conductive pattern 6b is configured to connect a U-phase coil to a U-phase coil, a V-phase coil to a V-phase coil, or a W-phase coil to a W-phase coil. Wiring of the coils 4 is performed by making a lead wire 4a of a coil 4 pass through a corresponding through hole 6a and soldering the lead wire 4a at the through hole 6a. This operation can be automated by incorporating reflow soldering therein.

Figure 5B:
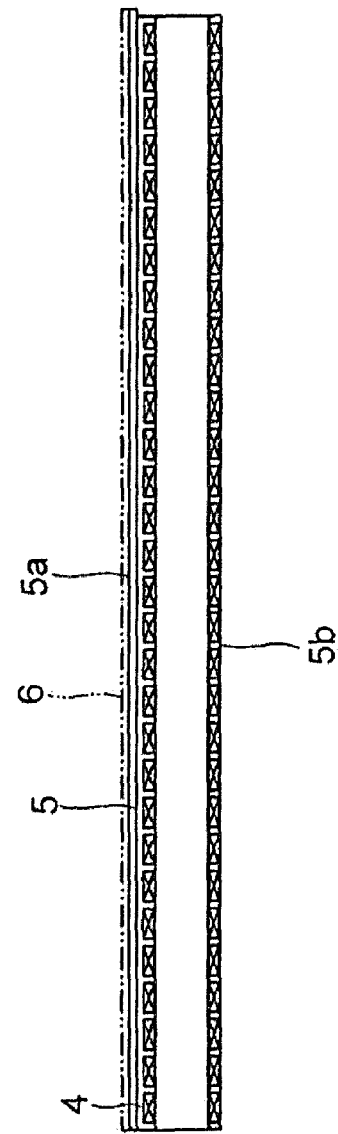
FIGS. 5(A) and 5(B) are views each illustrating a coil holder (FIG. 5(A) being a front view thereof and FIG. 5(B) being a cross-sectional view thereof taken along the axis line)
Figure 5A:
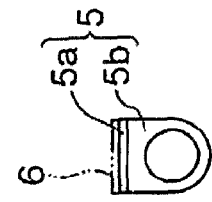
Figure 6A:
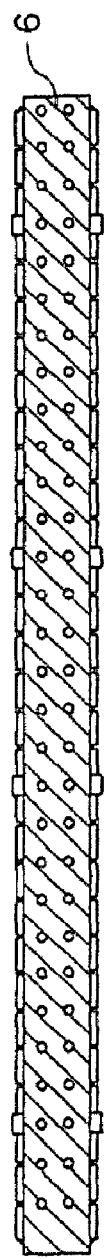
FIGS. 6(A) to 6(D) are views each illustrating another example of coil holder (FIG. 6(A) being a plan view thereof, FIG. 6(B) being a side view thereof, FIG. 6(C) being a bottom view thereof and FIG. 6(D) being a front view thereof)
Figure 6B:
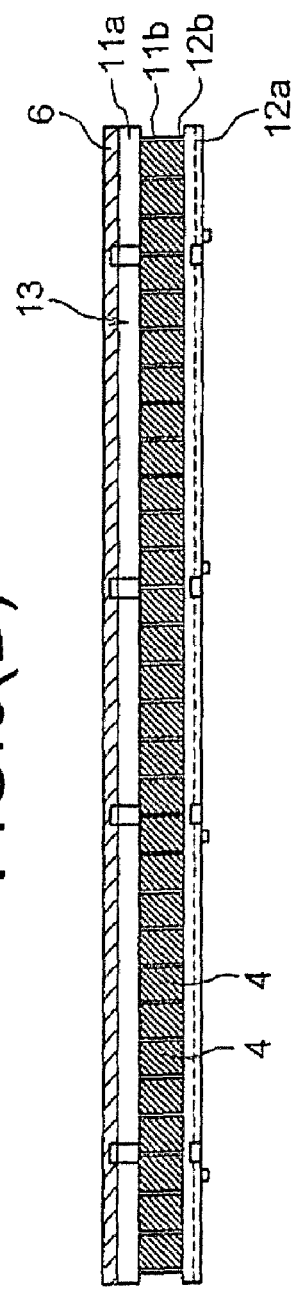
Figure 6C:
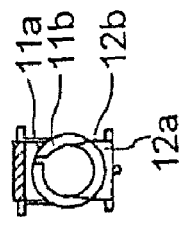
Figure 6D:
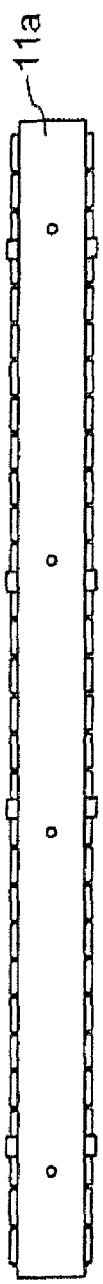

FIGS. 5(A) and 5(B) are views illustrating in detail coils 4 and a coil holder 5 holding the coils 4. As it is necessary to insulate adjacent coils 4 from each other, a spacer portion 5b made of resin is interposed as an insulating material between adjacent two coils 4. Each spacer portion 5b is formed in the shape of circular ring like the front surface shape of each coil 4. Conventionally, spacer portions and coils were stacked by turns one on another into a coil unit, however such operation took more man-hours and the overall length of the coil unit was not stabilized. In order to solve this problem, spacer portions 5b are formed integral with a plate-shaped holder main body 5a elongating in the coil arrangement direction of the coils 4. In other words, the coil holder 5 is injection-molded with resin, and the coil holder 5 is configured to have a plate-shaped holder main body 5a elongating in the coil arrangement direction of the coils 4 and a plurality of thin spacer portions 5b elevated from the holder main body 5a, the holder main body 5a and the spacer portions 5b being integrally formed in one piece.

The length in the coil arrangement direction of the coils 4 in the holder main body 5a is approximately equal to the overall length of the coil unit, and the horizontal width thereof is approximately equal to the diameter of each coil 4. On the upper surface of the holder main body 5a, a mounting seat for the insulating substrate 6 is formed elongating over the coil unit. On the side surfaces of the holder main body 5a, there are provided projections 5c (see FIG. 3) for securing the coil holder to a die during injection molding. The projections are provided to prevent displacement of the coil holder 5 due to pressure in injection molding. Under the lower surface of the holder main body 5a, a curved-surface recess 5d is formed conforming to the outer shape of coils 4. As shown in FIG. 3, each coil 4 has lead wires 4a. In order to lead the lead wires 4a into through holes 6a of the insulating substrate 6, the holder main body 5a has a plurality of wiring holes at the same positions as the through holes 6a of the insulating substrate 6.

As illustrated in FIG. 5(A), each spacer portion 5b is formed to have a ring section like a front face shape of each coil 4 and is provided downwardly from the plate-shaped holder main body 5a. The spacer portion 5b is provided between every adjacent two of the coils 4 and also to each end of the coil unit. Accordingly, the number of the spacer portions 5b is one more than the number of coils.

Description below is made about an assembling method of coils using the above-mentioned coil holder. First, as shown in FIG. 3, coils 4 are fit into the coil holder 5. When the coil holder 5 having integrally formed spacer portions 5b and holder main body 5a is used, the coils 4 can be positioned in their arrangement direction only by fitting the coils 4 into the coil holder 5. In this stage, lead wires 4a of the coils 4 pass through wiring holes of the coil holder 5.

Then, the coils 4 are positioned with respect to the direction orthogonal to the coil arrangement direction by making a coil arrangement shaft as a jig pass through the coil unit. This is followed by mounting an insulating substrate 6 on the coil holder 5 and making the lead wires 4a of the coils 4 pass through the through holes 6a of the insulating substrate 6. Here, the step of making the coil arrangement shaft pass through the coil unit may be performed after the step of mounting the insulating substrate 6 on the coil holder 5. Then, after the coils 4 are secured to the coil holder 5 by an adhesive agent or the like, the lead wires 4a of the coils 4 are soldered to the through holes 6a of the insulating substrate 6. The coil holder 5, the plural coils 4 and the insulating substrate 6 are formed into a coil assembly, which is then subjected to insert molding for forming the housing 2 as described above.

FIGS. 6(A) to 7(B) illustrate another example of the coil holder. FIGS. 6(A) to 6(D) show a coil holder 13 holding coils 4, while FIGS. 7(A) and 7(B) show an exploded view of the coil holder 13. The above-described coil holder 5 is provided, at one side of the coils 4, with the holder main body 5a elongating in the coil arrangement direction of the coils 4, while the coil holder 13 of this example has holder main bodies 11a and 12a provided at both sides of the center line of the coils 4 so as to sandwich the coils 4.

When the coil assembly is subjected to insert molding, pressure of molten resin is applied to the coil assembly, and a force is also applied due to contraction of the resin. When the holder main body 5a is provided to only one side of the coils 4, the opposite side of the coils 4 is not constrained, and the holder main body 5a may suffer some expanding or warping. In order to solve the problem, the holder main bodies 11a and 12a of the coil holder 13 are arranged to the respective sides of the coils 4 in balance. In other words, the coil holder 13 consists of the holder main bodies 11a and 12a in pair provided to the respective sides of the coils 4 and split spacer portions 11b and 12b integrally formed on the paired holder main bodies 11a and 12a. Then, each of the split spacer portions 11b and 12b is in the shape of a half ring and the upper split spacer portion 11b and the lower split spacer portion 12a are combined into the ring-shaped spacer portion.

Similarly to the above-described holder, the holder main bodies 11a and 12a have respective projections for fixing them to the die and recesses conforming to the outer shape of each coil 4, and the insulating substrate 6 is mounted on the upper holder main body.

Also for the coil holder 13 of this example, the coil unit is assembled by first fitting the coils 4 in between the split spacer portions 11b of the upper holder main body 11a, and then fitting the split spacer portions 12b of the lower holder main body 12a thereto so that the split spacer portions 11b abut to the respective split spacer portions 12b. In this assembling, the steps can be reduced in number and the whole length of the coil unit can be stabilized.

The present invention is not limited to the above-described embodiments and can be embodied in various forms without departing from the scope of the present invention. For example, the linear motor of this invention is not limited to a one-axis actuator and may be used in damping of a suspension device for motor vehicle. In this case, a damping force may be generated actively by changing the position of the rod with use of current passing through the coils or passively by using the linear motor as an electric generator. Further, the insulating substrate for wiring may serve as a holder main body. In this case, the spacer portion is formed integrally with the insulating substrate by injection molding. Furthermore, in the above-described embodiments, the rod moves linearly relative to the coils, however, the coils may move linearly relative to the rod.

The present specification is based on Japanese Patent Application No. 2005-282511 filed on Sep. 28, 2005, the entire contents of which are entirely incorporated by reference herein.

The invention claimed is:

1. A linear motor for obtaining a thrust for linear movement with use of a magnetic field and coil carrying current, comprising:
   a rod having magnets;
   a plurality of coils surrounding the rod and arranged in an axial direction of the rod;
   a housing covering the coils; and
   a coil holder holding the coils in the housing, the coil holder having a holder main body elongated in a coil arrangement direction and having a plurality of preformed spacer portions made of resin, the spacer portions being formed integrally with the holder main body, and each coil being disposed in between adjacent preformed spacer portions of the coil holder,
   wherein the holder main body comprises a pair of holder main bodies which are plate-shaped and arranged in respective outer sides of the coils so as to surround the coils, and
   each of the holder main bodies has split spacer portions formed integrally therewith, each of the split spacer portions consisting of a half ring shape and when both of the holder main bodies together are in an assembled state, the split spacer portions constitute the spacer portions in a ring shape.

2. The linear motor according to claim 1, further comprising an insulating substrate having a through hole for each of lead wires of the coils to pass through and a conductive pattern for wiring the coils.

3. The linear motor according to claim 2, wherein the insulating substrate is a separate piece from the holder main body and mounted on the holder main body which has a wiring hole for each of the lead wires of the coils.

4. A method of manufacturing a linear motor having a rod with magnets and a plurality of coils surrounding the rod and arranged in an axial direction of the rod, and being configured to obtain a thrust for linear movement with use of a magnetic field of the magnets and current passing through the coils, comprising the steps of:
   setting the plurality of coils and a coil holder, having a holder main body elongated in a coil arrangement direction and having a plurality of preformed spacer portions made of resin and formed integrally with the holder main body, in a die for injection molding, wherein each one of the plurality of coils is interposed between adjacent spacer portions; and
   forming a housing by injection molding material into the die, then surrounding the coils with the housing, and
   wherein the holder main body comprises a pair of holder main bodies which are plate-shaped and arranged in respective outer sides of the coils so as to surround the coils, and
   wherein each of the holder main bodies has split spacer portions formed integrally therewith, each of the split spacer portions consisting of a half ring shape and when the holder main bodies in pair are assembled, the split spacer portions constitute the spacer portions in a ring shape.

5. The method according to claim 4, further comprising the step of making each lead wire of the coils pass through a through hole of an insulating substrate having a conductive pattern formed for wiring the coils and connecting the lead wire to the through hole with solder.

* * * * *

UNITED STATES PATENT AND TRADEMARK OFFICE
CERTIFICATE OF CORRECTION

PATENT NO. : 8,390,153 B2  Page 1 of 1
APPLICATION NO. : 12/088556
DATED : March 5, 2013
INVENTOR(S) : Aso et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this
First Day of September, 2015

Michelle K. Lee
*Director of the United States Patent and Trademark Office*